(12) United States Patent
Hodson et al.

(10) Patent No.: US 6,815,057 B2
(45) Date of Patent: Nov. 9, 2004

(54) LAMINATED THERMOFORMABLE FILM STRUCTURES USEFUL FOR PACKAGING FOOD PRODUCTS

(75) Inventors: Jay D. Hodson, Greenville, WI (US); Kevin Douglass, Glen Ellyn, IL (US); Duane H. Buelow, Neenah, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 10/164,137

(22) Filed: Jun. 5, 2002

(65) Prior Publication Data

US 2002/0187290 A1 Dec. 12, 2002

Related U.S. Application Data

(62) Division of application No. 09/589,829, filed on Jun. 8, 2000.

(51) Int. Cl.[7] .......................... B32B 15/04; B32B 7/12
(52) U.S. Cl. ..................... 428/349; 428/354; 428/35.7; 428/516; 428/522; 220/62.22; 206/557
(58) Field of Search ............................. 428/522, 36.9, 428/36.91, 35.7, 349, 354, 347, 516; 206/557, 524.2; 220/62.22, DIG. 11

(56) References Cited

U.S. PATENT DOCUMENTS

| | | | |
|---|---|---|---|
| 4,437,787 A | 3/1984 | van der Ploeg et al. | 425/84 |
| 4,472,339 A | 9/1984 | van der Ploeg et al. | 428/220 |
| 4,492,153 A | 1/1985 | Grabowski | 99/460 |
| 4,560,520 A | 12/1985 | Erk et al. | 264/22 |
| 4,601,929 A | 7/1986 | Erk et al. | 428/36 |
| 4,668,575 A | 5/1987 | Schinkel et al. | 428/349 |
| 4,784,885 A | * 11/1988 | Carespodi | 428/36.8 |
| 4,977,031 A | 12/1990 | Temple | 428/463 |
| 5,065,671 A | 11/1991 | Tameris | 428/518 |
| 5,227,079 A | 7/1993 | Tameris | 249/117 |
| 5,310,584 A | * 5/1994 | Jacoby et al. | 428/2 |
| 5,356,676 A | 10/1994 | von Widdern et al. | 428/474.4 |
| 5,538,770 A | 7/1996 | Bekele | 156/244.14 |
| 5,595,623 A | 1/1997 | Lulham et al. | 156/244.14 |
| 5,635,286 A | * 6/1997 | Morita et al. | 428/213 |
| 5,723,567 A | 3/1998 | Hewel et al. | 426/90 |
| 5,726,229 A | 3/1998 | Bekele | 428/34.8 |
| 5,763,095 A | 6/1998 | Ramesh et al. | 428/463 |
| 5,766,772 A | * 6/1998 | Ciocca et al. | 428/516 |
| 5,843,581 A | 12/1998 | Paleari et al. | 264/219 |
| 5,863,643 A | 1/1999 | von Widdern et al. | 428/220 |
| 5,932,157 A | * 8/1999 | Dries et al. | 264/176.1 |
| 5,958,480 A | 9/1999 | Eggink et al. | 426/90 |

* cited by examiner

*Primary Examiner*—Harold Pyon
*Assistant Examiner*—Michael C. Miggins
(74) *Attorney, Agent, or Firm*—McDermott Will & Emery LLP

(57) ABSTRACT

Laminated multiple layered thermoplastic film structure comprising a single layered extruded portion which is laminated to a coextruded sealant film structure containing a cheese release additive are disclosed. The film structures are useful in the packaging of food products, especially cheese.

9 Claims, 3 Drawing Sheets

LAMINATED THERMOFORMABLE FILM STRUCTURES USEFUL FOR PACKAGING FOOD PRODUCTS

This application is a Division of Ser. No. 09/589,829, filed Jun. 8, 2000, now pending.

This invention relates to thermoplastic polymeric films useful in the packaging of food products, especially, cheese and other dairy products. More specifically, the invention is in the field of polymeric thermoplastic films that are thermoformable i.e., may be softened through the application of heat, distorted to a desired shape, and cooled.

Polymeric films are useful in the packaging field for the packaging of products, especially food products. Films used for the packaging of food, generally contain multiple layers in which each layer adds certain desired physical or chemical properties to the completed film. Food packaging methods utilizing polymeric films can be exemplified in many ways, i.e., enveloping the product in a polymeric clear film or placing the product in a rigid structure which is formed from a polymeric thermoplastic film. It is the latter of these methods to which this invention is directed.

The use of thermoformable film structures to form rigid structures such as trays or tubs is known. It is also known that these rigid structures usually require a lidding component. The lidding component can be a flexible sheet material which is adhered to the structure to form a closing and sealing lid. The lidding component can also be a rigid plastic cap. The lidding component can also be a combination of the two.

The use of formed, rigid structures and lidding, in general, is known and applicable to the packaging of food products. For examples, jellies, jams, dressing, yogurt and pudding are commonly packaged in individual servings in formed trays with peelable sheet materials used for lids sealed to the trays. Larger trays and accompanying lids have been used in the packaging of complete servings of prepared foods. However, in the packaging of some food products such as a processed cheese loaf, the packaging is limited to a corrugated box in which the cheese loaf is placed. This type of packaging has the following disadvantages (a) lack of portion control, i.e., smaller individual servings; (b) lack of reclosability; and (c) lack of resealability.

Therefore, there is a need to develop a package for this type of product that will overcome the disadvantages of the old package and yet meet the processing and packaging requirements of the product.

The package for the cheese product must withstand relatively severe processing conditions either at the points where the package is being filled or sealed or at the point where the package and/or its contents is to be used. Such packaging typically encounters substantial heat at the point where the package is filled and sealed, and may be subjected to significant heat at the point where the package is used. At the point of packaging, the packaging may be subjected to, for example, hot-filled product at approximately 165° F. The package must also provide protection to the contained food from the permeation of substances into the package from the outside environment. Substances which can have undesirable affects on the contained product are, for example, oxygen, moisture, contaminants and light. It is especially important to protect the packaged contents from oxygen, moisture and light, in addition to the typical containing and protecting functions of the package. The rigid package also serves as a cheese mold to shape the final product when cooled. The package also needs cheese release or the ability to allow easy removal of the cheese loaf by the consumer without significant residue and adhesion of the product to the container walls.

Resins for providing these individually desired protective properties are known and are available, and are commonly used in packaging applications. For example, oxygen penetration can be successfully impeded through the use of vinyl alcohol polymers such as ethylene vinyl alcohol copolymer and vinylidene chloride copolymers. Moisture penetration may be prevented by use of certain polymers, for example, polyolefins.

Description of the Prior Art

Ramesh, et al., U.S. Pat. No. 5,763,095 discloses a multilayer film having a combination of relatively low oxygen transmission and relatively high carbon dioxide transmission. The film includes at least one layer containing a nylon copolymer.

van der Ploeg, et al., U.S. Pat. No. 4,472,339 discloses a process of manufacturing a plastic cheese mold, comprising: providing a mold having a cavity defined in it, which cavity is shaped to define the exterior wall of the container, and which mold is further comprised of a mandrel, or the like, fitted into the cavity, wherein the mold defines an outer, inwardly facing wall of the cavity and the mandrel, or the like, defines an opposite, inner, outwardly facing wall, and the mold and the mandrel, or the like, being shaped to define a relatively thin walled opening between the outer and opposite inner walls thereof; applying a porous non-woven layer of polyolefin fibers to the inner wall of the mold; and filling the cavity by injection molding with a liquid mass of polyolefin material at an elevated temperature selected for the polyolefin material to heat seal to the fibers of the non-woven layer.

Lulham, et al., U.S. Pat. No. 5,595,623 discloses a method of making a film comprising: blending from about 5% to about 95% by weight of ethylene vinyl acetate copolymer having from about 3% to about 18% by weight of vinyl acetate with from about 5% to about 95% by weight of ethylene/alpha-olefin copolymer having a density of less than about 0.915 g/cc; extruding said blend through a circular coextrusion die; immediately blowing the extrudate to a diameter appropriate for achieving the desired thickness for the final film; cooling the coextruded film; and collapsing the cooled film.

Temple, U.S. Pat. No. 4,977,931 discloses a packing material, generally in sheet form, made from a combination of a support sheet and a water-retentive material that is intimately connected to the support sheet. Moisture or exudate originating from a product enclosed by the packing material is absorbed and retained by the water-retentive material without affecting the physical strength of the support sheet or the packaged product. In a preferred embodiment, the support sheet is made of paper or a polymeric material, such as polyethylene, and the water retentive material is formed from polyacrylonitrile, or a polyacrylonitrile based co-polymer, treated with an alkaline aqueous solution of aliphatic or cycloaliphatic monofunctional or polyfunctional alcohols that have melting points greater than or equal to 110° C. The packaging material is ideal for the packaging of moisture sensitive foods, such as cheese.

It is an object of this invention to provide novel thermoplastic film structures, sheet materials and novel packages made from said thermoplastic film structures and said sheet materials.

The rigid structures which are molded from the thermoplastic film structures of the present invention are capable of withstanding hot-fill temperatures of about 165° F. The rigid structures are also capable of protecting the package contents from penetration, moisture and light and in certain preferred embodiments from oxygen.

It is a specific object of the invention to provide a laminated multiple layer thermoplastic film structure comprising a three layer coextruded portion which is laminated to a coextruded sealant film structure containing a cheese release additive.

It is another specific object of the invention to provide a novel film structure having an oxygen barrier resin core layer in the sealant film structure.

It is another specific object of the invention to provide a rigid structure which is produced from the thermoplastic film structures of the present invention wherein said structure is capable of withstanding a hot-fill temperature of about 165° F.

It is another specific object of the present invention to provide a package comprising a rigid structure which is made from the film structures of the present invention and a lidding component.

Definition of Terms

Unless specifically set forth and defined or otherwise limited, the following terms as used herein have the following meanings.

Adhesive shall mean substances which bind/adhere; adhesives as used herein can generally be classified either as tie resins or laminating adhesives.

Caliper shall mean the thickness of a film layer.

Cheese release additive shall mean GMS, GMO or other fatty acids or a blend of GMS, GMO or other fatty acids and a polyolefin such as poly(propylene).

Core or core layer shall mean an interior layer of a multilayer film having an odd number of layers wherein the same number of layers is present on either side of the core layer.

Ethylene vinyl acetate copolymer (EVA) shall mean a copolymer formed from ethylene and vinyl acetate monomers wherein the ethylene derived units in the copolymer are present in major amounts and the vinyl acetate derived units in the copolymer are present in minor amounts.

Ethylene vinyl alcohol copolymer (EVOH) shall mean a copolymer formed by the hydrolysis of poly(vinyl acetate).

GMO shall mean glycerol mono-oleate.

GMS shall mean glycerol mono-stearate.

HIPS shall mean high impact poly(styrene).

Interior or interior layer shall mean a layer of a multilayer film which is not a skin or surface layer of the film.

Intermediate or intermediate layer shall mean an interior layer of a multilayer film which is positioned between a core layer and a surface layer of said film.

LDPE shall mean low density poly(ethylene).

LLDPE shall mean linear low density poly(ethylene).

PET shall mean poly(ethylene) terephthalate.

Polyethylene shall mean families of resins obtained by substantially polymerizing the gas ethylene. By varying the comonomers, catalyst and methods of polymerization, properties such as density, melt index, crystallinity, degree of branching, molecular weight and molecular weight distribution can be regulated over wide ranges. Polyethylenes include low density polyethylenes (LDPE); medium density polyethylenes (MDPE); and high density polyethylenes (HDPE). Comonomers which are useful in the polyethylene resin family are alpha-olefins having from 4 to 20 carbons.

Polymer or polymer resin include but are not limited to, homopolymers, copolymers, such as for example, block, graft, random and alternating copolymers, terpolymers, etc., and blends and modifications thereof. Polymer or polymer resin shall also include all possible molecular configurations of the material. These structures include but are not limited to, isotactic, syndiotactic and random molecular configurations.

Polyolefins shall mean polymers of olefins such as, for example, ethylene, propylene, butenes, isoprenes and pentenes; including but not limited to homopolymers, copolymers, blends and modifications of said olefins.

PVC shall mean poly(vinylchloride).

Regrind shall mean recycled material from the film structure; regrind shall also include in addition to the recycled material "virgin" material wherein said material is selected from any of the components of the film structure.

Surface or surface layer or skin or skin layer shall mean a layer of a multilayer film which comprises a surface thereof.

Thermoformable shall mean softened through the application of heat, distorted to a desired shape, and cooled.

Tie resin or layer shall mean an adhesive comprised of thermoplastic polymer that has some affinity for materials it is meant to adhere to or bind together; typically tie resins are used in coextrusion or extrusion lamination and typically are polyolefin copolymers such as EVA, EAA or EMA, or polyolefins that are grafted with maleic anhydride (examples of grafted materials are Plexar® from Equistar and Bynel® from DuPont).

SUMMARY OF THE INVENTION

The present invention provides a laminated thermoplastic film structure comprising a extruded single layer film structure comprising a polymer selected from the group consisting of HIPS, PVC, PET, polypropylene, high density polyethylene or polyacrylonitrile; which is laminated to a three layered non-barrier coextruded sealant film containing a cheese release additive wherein said three layered sealant film comprises a first layer comprising a polyolefin; a second layer comprising a polyolefin; and a third layer comprising a sealant polymer wherein said polymer is ethylene vinyl acetate or low density polyethylene and wherein said cheese release additive can be present in one or more of the layers of said sealant film structure. The present invention further provides a laminated thermoplastic film structure comprising a extruded single layer film structure comprising a polymer selected from the group consisting of HIPS, polypropylene, high density polyethylene, PVC, PET or polyacrylonitrile; which is laminated to a five layer coextruded barrier sealant film containing a cheese release additive wherein said five layer film structure comprises a first layer comprising an oxygen barrier polymer; a second layer comprising an adhesive or tie polymer wherein said second layer is disposed in contact with said first layer; a third layer comprising an adhesive or tie polymer wherein said third layer is disposed in contact with said first layer and opposite said second layer; a fourth layer comprising a polymer selected from the group consisting of high density poly(ethylene) low density polyethylene, linear low density polyethylene ethylene vinyl acetate or polypropylene wherein said fourth layer is disposed in contact with said second layer; and a fifth layer comprising a sealant polymer wherein said fifth layer is disposed in contact with said third layer and wherein a cheese release additive may be present in one or more layers of the five layer barrier sealant film structure.

The present invention also provides for a thermoformed rigid structure which is capable of withstanding a hot-filled temperature of about 165° F. The thermoformed rigid structure is produced from a thermoplastic film structures of the present invention.

The present invention also provides a package comprising a thermoformed rigid structure which is produced from a thermoplastic multiple layer film structure and a lidding component. Said lidding component being a flexible sheet material, a rigid polymeric cap or a combination a sheet material and a rigid polymeric cap.

DETAILED DESCRIPTION OF THE INVENTION

Figure 1:
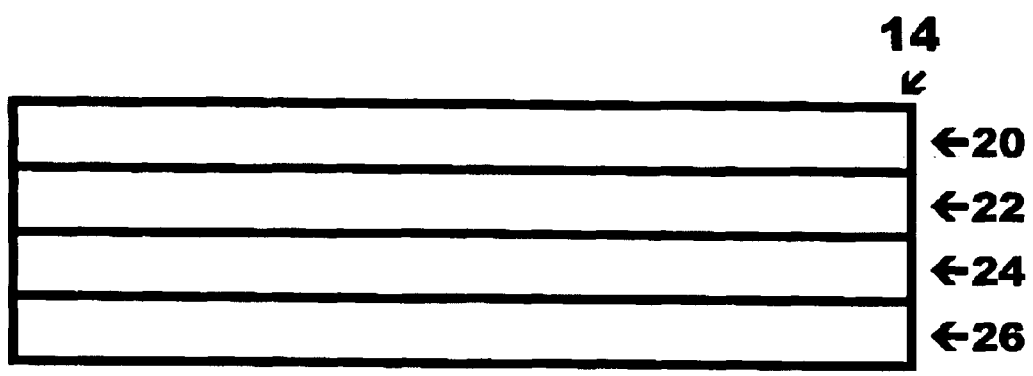
FIG. 1 depicts a four layer film structure of the present invention.

In its first embodiment, the thermoplastic film structure of the present invention is a single layered structure which is laminated to a three layer non-barrier sealant film. The total film structure may have any thickness, and preferably has thickness of from 20 to 60 mils, most preferably from 30 to 40 mils.

The polymer for the single layer extruded film structure may be selected from the group consisting of polypropylene, high density polyethylene, PVC, PET, polyacrylonitrile or HIPS or a blend of said polymers; a particularly preferred embodiment for this single layer extruded film structure is HIPS. A preferred HIPS is Styron 484, Dow Chemical, Midland, Mich. A preferred poly(propylene) is Exxon PD-5132 from Exxon-Mobil, Baytown, Tex. The single layer film structure has a thickness from 20 mils to 60 mils, preferably from about 30 mils to 40 mils.

The coextruded non-barrier sealant film which is laminated to the extruded single layered film is a 3 layer non-barrier film structure wherein the polymer for any one of the three layers is selected from the group consisting of poly(propylene) high density polyethylene or low density poly(ethylene) [others] and wherein a cheese release additive may be present in one or more of the layers and wherein any one of said layers may be a blend of polymers. A preferred embodiment of the 3-layer non-barrier film structure comprises a first layer comprising poly(propylene); a second layer comprising poly(propylene) and a cheese release additive and a third layer comprising low density poly(ethylene) and a cheese release additive. A preferred poly(propylene) is Exxon 1043 from Exxon-Mobil, Baytown, Tex. A preferred low-density poly(ethylene) is LDPE 135.09 from Exxon-Mobil. A preferred cheese release additive is GMS. The non-barrier sealant film has a thickness from 1 mils to 5 mils, preferably about 2.0 mils.

In another embodiment of the present invention the coextruded sealant film which is laminated to the single layer film structure may be a five-layer barrier sealant film structure.

This barrier film structure comprises a first layer comprising an oxygen barrier polymer wherein said polymer is selected from ethylene vinyl alcohol copolymer or polyvinylidene dichloride; second layer comprising a tie or adhesive polymer selected from a maleic anhydride polyolefin wherein the polyolefin is selected from high density polyethylene, low density polyethylene, linear low density poly(ethylene), ethylene vinyl acetate copolymer or polypropylene; a third layer comprising a tie or adhesive polymer selected from a maleic anhydride polyolefin wherein the polyolefin is selected from high density polyethylene, low density polyethylene, linear low density, poly(ethylene), ethylene vinyl acetate copolymer or polypropylene wherein said third layer is disposed in contact with said first layer and opposite said second layer; a fourth layer comprising a polymer selected from the group consisting of high density poly(ethylene), low density poly (ethylene) poly(propylene), linear low density polyethylene or ethylene vinyl acetate copolymer; wherein said fourth layer is disposed in contact with said second layer; and a fifth sealant layer comprising a polymer selected from the group consisting of linear low density polyethylene, low density polyethylene or ethylene vinyl acetate copolymer and a cheese release additive wherein said fifth layer is disposed in contact with said third layer.

A particularly preferred embodiment of the five layer barrier sealant film structure comprises a first layer comprising ethylene vinyl alcohol; a second layer comprising maleic anhydride modified polypropylene wherein said second layer is disposed in contact with said first layer, a third layer comprising maleic anhydride modified polypropylene wherein said third layer is disposed in contact with said first layer and opposite said second layer; a fourth layer comprising poly(propylene) wherein said fourth layer is disposed in contact with said second layer; and a fifth layer comprising low density polyethylene and GMS wherein said fifth layer is disposed in contact with said third layer.

In another embodiment, the present invention is a rigid structure which is made from the thermoplastic film structures of the present invention. In a preferred embodiment of the rigid structure, the structure is a tub having the following dimensions 4"×9"×2.5" and depicted in FIG. 3. The rigid structure is made by conventional extrusion lamination process. The two are laminated by molten polyolefin, preferably LDPE.

The rigid structure could be a single unit or the rigid structure could also be designed with separate individual sections, hermetically sealed compartments.

While a particular rigid structure has been exemplified, it is to be understood that the rigid structure may have many shapes depending on the shape of the mold.

In the present invention the rigid structures which are formed from the thermoplastic film structures of the invention are capable of withstanding hot-filled temperature of about 165° F.

In still another embodiment, the present invention is a package comprising a rigid structure which is made from the thermoplastic film structures of the present invention and a lidding structure.

The rigid structures of the present invention have been described above. The lidding structure can be a sheet material, a rigid plastic cap or a combination of the two. A sheet material can be exemplified by a foil-based polyolefin film structure wherein the structure is PET/adh/foil/ PEsealant. A rigid plastic cap can be exemplified by 20 ml polypropylene rigid structure in a shape to effect a closure over the bottom rigid structure. The rigid lidding structure can be placed directly over the bottom rigid structure or can be placed over the sheet material which has been affixed to the bottom rigid structure. In preferred embodiments of the present invention, the cheese release additive is present in one or more of the layers of the film structure, preferably the sealant layer. The cheese release additive, however, could be dusted or sifted on to the thermoformed rigid structure. The cheese release additive could also be coated onto the film structure in the form of a starch slurry prior to forming the rigid structure.

The total film structures of the present invention may have any thickness, and preferably has thickness of from 20 to 60 mils, most preferably from 30 to 40 mils.

The following non-limiting examples are given by way of the illustration and are not intended to be considered a limitation on the invention.

EXAMPLE 1

By coextrusion, a three layer thermoplastic sealant film structure was produced comprising a first layer of polypropylene; a second layer of polypropylene and GMS and a third layer of low density polyethylene and GMS. This film structure has the following specification:

| Layer | Resin | % of Layer | Layer Caliper |
|---|---|---|---|
| 1 | Polypropylene [Exxon 1043, Exxon-Mobil, Baytown, Texas] | 40 | |
| 2 | Polypropylene [Exxon 1043, Exxon-Mobil, Baytown, Texas] | 40 | |
| 3 | Low density polyethylene GMS [Exxon 135.09, Exxon-Mobil, Baytown, Texas] | 20 | |
| Total | | | 2.0 mils |

The above film structure was then laminated to a film structure produced by extrusion comprising a single layer comprising HIPS.

EXAMPLE 2

By coextrusion, a five layer barrier sealant film structure was produced comprising a first layer comprising ethylene vinyl alcohol copolymer, a second layer comprising polypropylene grafted with maleic anhydride; a third layer comprising a maleic anhydride grafted polypropylene; a fourth layer comprising polypropylene; and a fifth layer comprising low density polyethylene and GMS. This film structure has the following specification:

| Layer | Resin |
|---|---|
| 1 | EVOH, Evalca LC-F1001A |
| 2 | Maleic anhydride modified polypropylene [Admer QF-500 A from Mitsui Chemical, Tokyo Japan] |
| 3 | Maleic anhydride modified polypropylene [Admer QF 500 A from Mitsui Chemical, Tokyo Japan] |
| 4 | Polypropylene [Exxon 1043 from Exxon-Mobil, Baytown, Texas] |
| 5 | LDPE [Exxon 135.09 from Exxon-Mobil, Baytown, Texas] |

The above film structure is then laminated to the non-sealant film structure of Example 1.

DETAILED DESCRIPTION OF THE DRAWINGS

FIG. 1 shows a coextruded laminated film structure (14) which comprises a first layer (20); wherein the polymer is selected from the group consisting of polypropylene, high density polyethylene, low density polyethylene, PVC, PET, polyacrylonitrile or HIPS; which is laminated to a three layer non-barrier sealant film comprising a first layer (22) comprising a polyolefin; second layer (24) comprising a poly(olefin); and a third layer (26) comprising a sealant polymer wherein a cheese release additive may be present in any one of the three layers, preferably in the sealant layer. Preferred embodiments of the film structures shown in FIG. 1 are discussed in detail under Detailed Description of the Invention.

Figure 2:
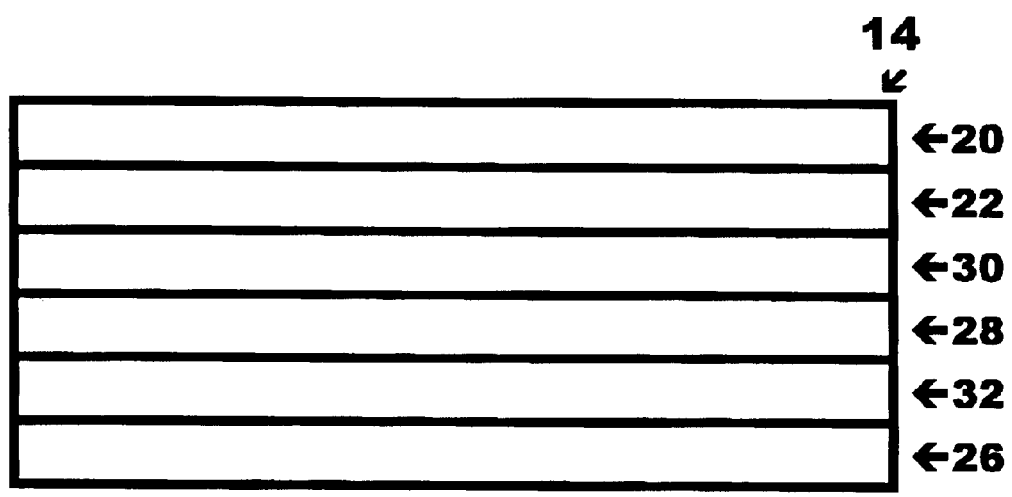
FIG. 2 depicts a six layer film structure of the present invention.

FIG. 2 shows a coextruded laminated film structure (14) which comprises a first layer (20); wherein the polymer is selected from the group consisting of polypropylene, high density polyethylene, low density polyethylene, PVC, PET, polyacrylonitrile or HIPS; which is laminated to a five-layer barrier sealant film comprising an oxygen barrier layer (28); a tie layer (30); a second tie layer (32); a layer comprising a polymer selected from the group consisting of high density poly(ethylene), poly(propylene), and a sealant layer (28) wherein cheese release additive may be present in one or more of the layers of the five-layer barrier film structures, preferably in the sealant layer. Preferred embodiments of the film structures shown in FIG. 2 are discussed in detail under Detailed Description of the Invention.

Figure 3:
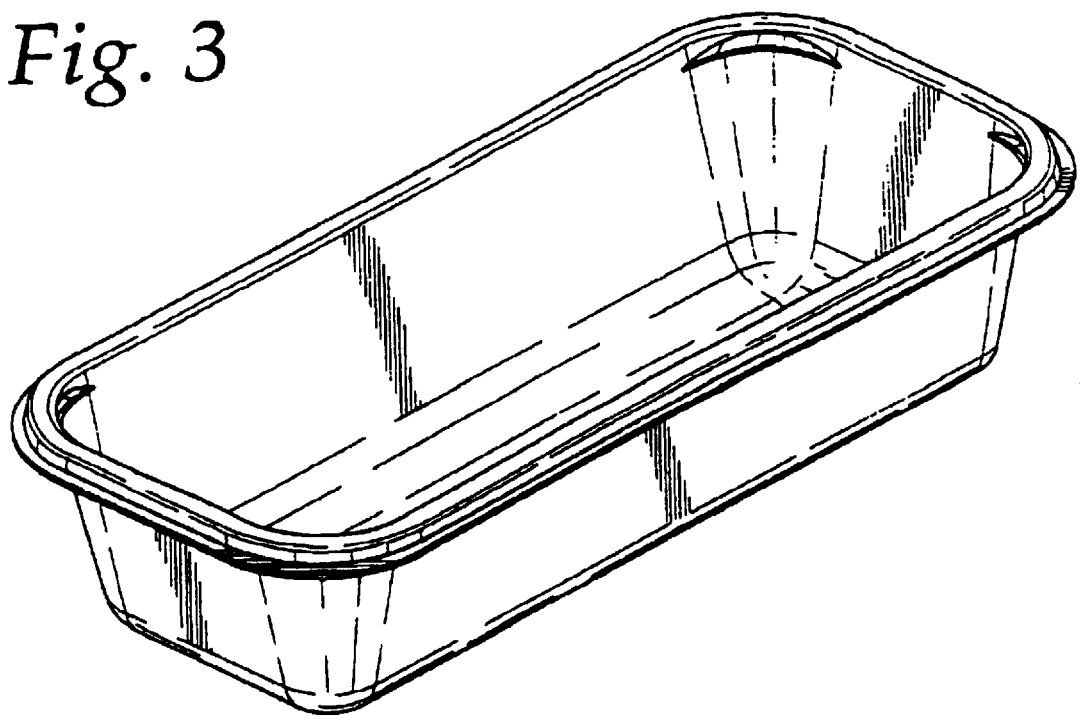
FIG. 3 depicts a rigid structure of the present invention.

FIG. 3 depicts a tub made from the thermoformable films of the present invention.

Figure 4:
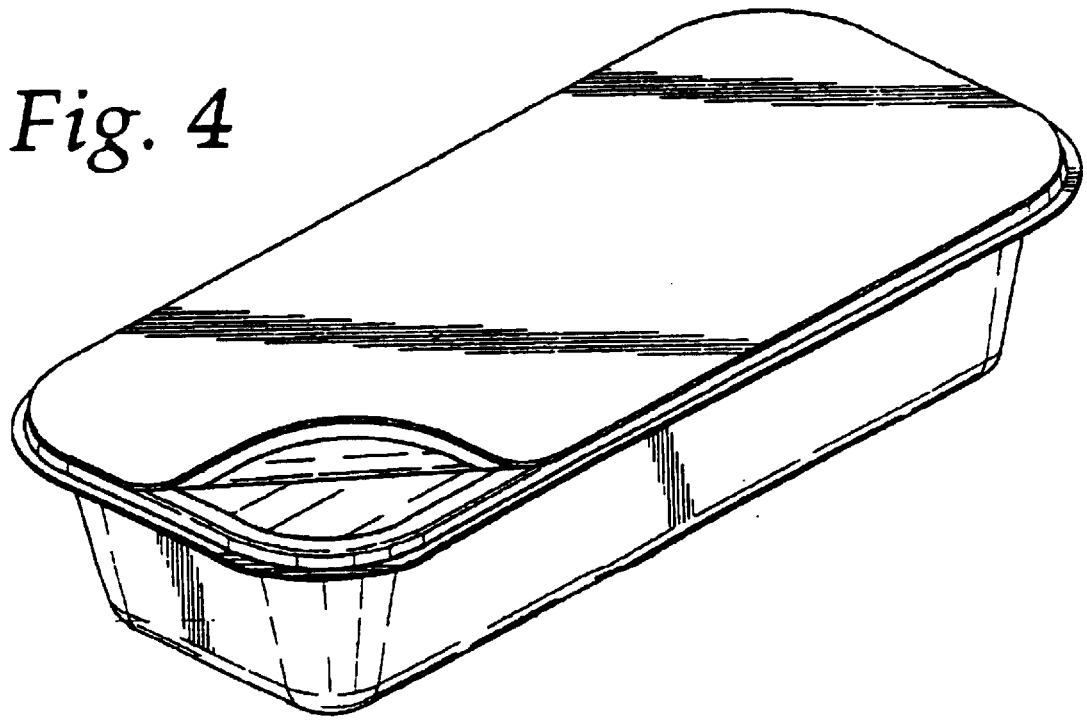
FIG. 4 depicts a package of the present invention.

FIG. 4 depicts a tub made from the thermoformable films of the present invention with a sheet material lidding component.

What is claimed is:

1. A laminated thermoplastic film structure comprising an extruded single layer comprising a polymer selected from the group consisting of HIPS, polypropylene, high density polyethylene, PVC, PET and polyacrylonitrile; which is laminated to a three layered non-barrier coextruded sealant film containing a cheese release additive wherein said three layered sealant film comprises a first layer comprising a polymer selected from the group consisting of poly(propylene), high density polyethylene and low density poly(ethylene); a second layer comprising a polymer selected from the group consisting of poly(propylene), high density polyethylene and low density poly(ethylene); a third layer consisting of sealant polymer and a cheese release additive wherein said sealant polymer is ethylene vinyl acetate or low density polyethylene and wherein said cheese release additive is selected from the group consisting of glycerol mono-oleate, glycerol-mono-stearate, fatty acid, and a blend of glycerol mono-oleate, glycerol mono-stearate or fatty acid and a polyolefin.

2. The laminated thermoplastic film structure according to claim 1 wherein said extruded single layer is poly(propylene).

3. The laminated thermoplastic film structure according to claim 1 wherein said first layer of the non-barrier sealant film is poly(propylene).

4. The laminated thermoplastic film structure according to claim 1 wherein the cheese release additive is glycerol-mono-stearate.

5. The laminated thermoplastic film structure according to claim 1 wherein the cheese release additive is present from about 1,000 ppm to 10,000 ppm.

6. The laminated thermoplastic film structure according to claim 1 wherein said second layer of the non-barrier sealant film is poly(propylene).

7. The laminated thermoplastic film structure according to claim 6, wherein the third layer of the non-barrier sealant film is low density poly(ethylene).

8. A rigid structure made from the laminated thermoplastic film structure of claim 1.

9. The rigid structure according to claim 8 in the form of a tub having dimensions of 4"×9"×2.5".

* * * * *